(12) United States Patent
Maier et al.

(10) Patent No.: US 11,870,307 B2
(45) Date of Patent: Jan. 9, 2024

(54) METHOD FOR INCREASING THE EFFICIENCY OF AN ENERGY TRANSFER DEVICE, ENERGY TRANSFER DEVICE, AND USE OF AN ELECTRICALLY CONDUCTIVE MATERIAL

(71) Applicant: Universitat Stuttgart, Stuttgart (DE)

(72) Inventors: David Maier, Bühl (DE); Marcel Maier, Stuttgart (DE); Nejila Parspour, Gerlingen (DE)

(73) Assignee: Universität Stuttgart, Stuttgart (DE)

( * ) Notice: Subject to any disclaimer, the term of this patent is extended or adjusted under 35 U.S.C. 154(b) by 273 days.

(21) Appl. No.: 17/339,612

(22) Filed: Jun. 4, 2021

(65) Prior Publication Data
US 2021/0408875 A1 Dec. 30, 2021

(30) Foreign Application Priority Data
Jun. 4, 2020 (DE) ...................... 10 2020 206 998.0

(51) Int. Cl.
*H02K 11/00* (2016.01)
*H02K 5/20* (2006.01)
(Continued)

(52) U.S. Cl.
CPC .............. *H02K 11/00* (2013.01); *H02J 50/10* (2016.02); *H02K 3/04* (2013.01); *H02K 5/20* (2013.01);
(Continued)

(58) Field of Classification Search
CPC .. H02K 11/00; H02K 11/012; H02K 11/0141; H02K 11/042; H02K 11/30;
(Continued)

(56) References Cited

U.S. PATENT DOCUMENTS

| 4,041,541 A | 8/1977 | Frossard et al. |
| 5,519,275 A | 5/1996 | Scott et al. |

(Continued)

FOREIGN PATENT DOCUMENTS

| CA | 2171700 A1 | 9/1996 |
| CN | 110635576 A | 12/2019 |

(Continued)

OTHER PUBLICATIONS

WO-2019038080-A1, Bulatow, all pages (Year: 2019).*

(Continued)

*Primary Examiner* — Naishadh N Desai
(74) *Attorney, Agent, or Firm* — Shook, Hardy & Bacon L.L.P.

(57) ABSTRACT

The present invention relates to a method for increasing the efficiency of an energy transfer device (100) with which electrical energy is converted contactlessly into electrical energy with the aid of a magnetic field in order to electrically excite a rotor of an electrical machine, comprising the step of:

arranging an additional electrically conductive material layer (13) on at least one active part (12, 19, 35, 45) of the energy transfer device (100), wherein an active part of the energy transfer device (100) is a part of the energy transfer device (100) which is at least partially exposed to the magnetic field used for energy transfer, and wherein the electrical conductivity of the additional material layer (13) is greater than the electrical conductivity of the at least one active part (12, 19, 35, 45).

Moreover, the invention relates to an energy transfer device (100) and to a use of an electrically conductive material.

15 Claims, 8 Drawing Sheets

(51) Int. Cl.
*H02K 7/00* (2006.01)
*H02K 11/30* (2016.01)
*H02J 50/10* (2016.01)
*H02K 3/04* (2006.01)
*H02K 9/00* (2006.01)

(52) U.S. Cl.
CPC ............... *H02K 7/003* (2013.01); *H02K 9/00* (2013.01); *H02K 11/30* (2016.01)

(58) Field of Classification Search
CPC ........ H02K 19/12; H02K 19/16; H02K 19/36; H02K 3/04; H02K 5/20; H02K 7/003; H02K 9/00; Y02P 20/52; H02J 50/005; H02J 50/10
See application file for complete search history.

(56) References Cited

U.S. PATENT DOCUMENTS

| | | | |
|---|---|---|---|
| 5,777,408 A | | 7/1998 | Brem |
| 8,052,860 B1* | | 11/2011 | Engelhaupt ............... B23H 5/06 205/641 |
| 2005/0218740 A1 | | 10/2005 | Stout et al. |
| 2009/0273251 A1 | | 11/2009 | Cordes et al. |
| 2010/0295397 A1* | | 11/2010 | Dowis .................... H02K 19/12 310/90 |
| 2015/0203197 A1 | | 7/2015 | Bajekal et al. |
| 2019/0058382 A1 | | 2/2019 | Gao et al. |

FOREIGN PATENT DOCUMENTS

| | | | | |
|---|---|---|---|---|
| DE | 2509002 A1 | 7/1976 | | |
| DE | 4333094 A1 | 3/1995 | | |
| DE | 19509264 A1 | 9/1996 | | |
| DE | 202 04 584 U1 | 8/2003 | | |
| DE | 10 2017 214 766 A1 | 4/2018 | | |
| DE | 102017214766 A1 * | 4/2018 | ......... | H01F 27/2804 |
| DE | 102019212406 A1 * | 2/2021 | ......... | H01F 27/2804 |
| EP | 3 331 128 A1 | 6/2018 | | |
| GB | 2378586 A * | 2/2003 | ............... | H02K 3/42 |
| GB | 2378586 A | 12/2003 | | |
| WO | 95/26069 A1 | 9/1995 | | |
| WO | WO-9526069 A1 * | 9/1995 | ............. | F02B 63/04 |
| WO | 03/081615 A1 | 10/2003 | | |
| WO | 2013/084164 A2 | 6/2013 | | |
| WO | WO-2018067148 A1 * | 4/2018 | ............. | B05D 3/107 |
| WO | 2019/038080 A1 | 2/2019 | | |
| WO | WO-2019038080 A1 * | 2/2019 | ......... | H01F 27/2804 |

OTHER PUBLICATIONS

WO-9526069-A1, Johnson, all pages (Year: 1995).*
DE-102019212406-A1, Bulatow, all pages (Year: 2021).*
DE-102017214766-A1, Bulatow, all pages (Year: 2018).*
WO-2018067148-A1, Lee, all pages (Year: 2018).*
GB-2378586-A, Le Flem G D, all pages (Year: 2003).*
Non-Final Office Action dated Oct. 24, 2022 in U.S. Appl. No. 17/339,635, 15 pages.
Final Office Action dated Mar. 9, 2023 in U.S. Appl. No. 17/339,635, 13 pages.

* cited by examiner

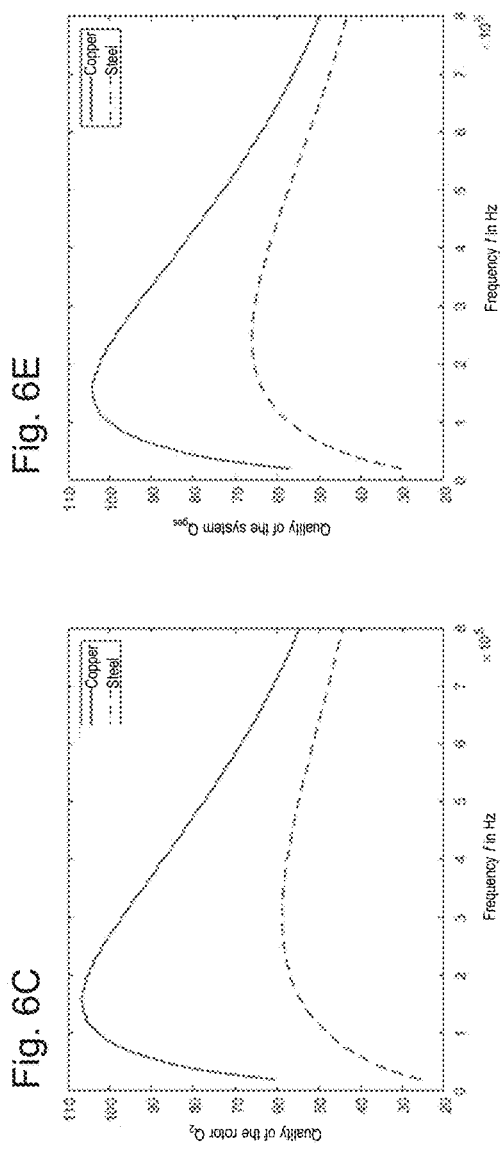
Fig. 6A
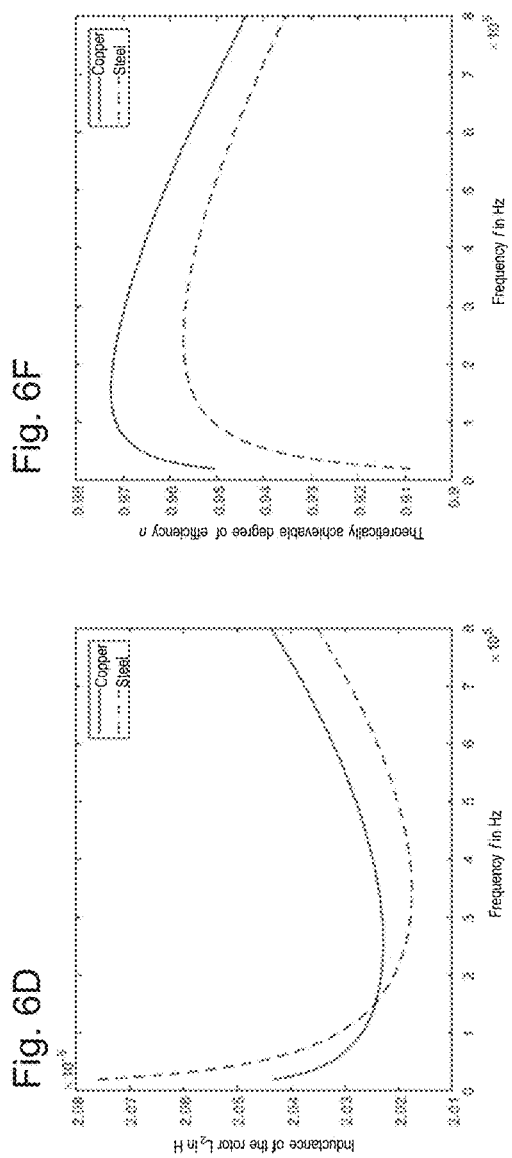
Fig. 6B
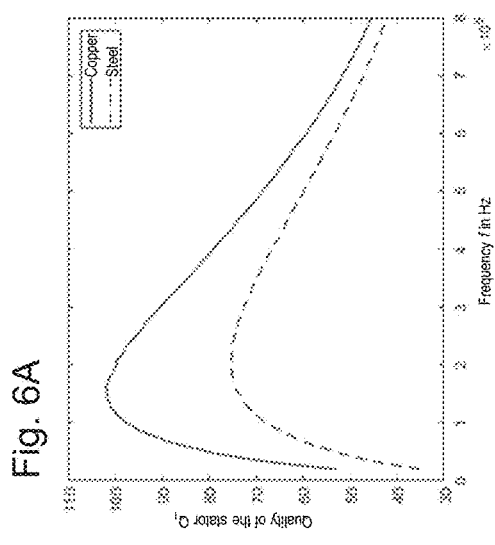
Fig. 6C
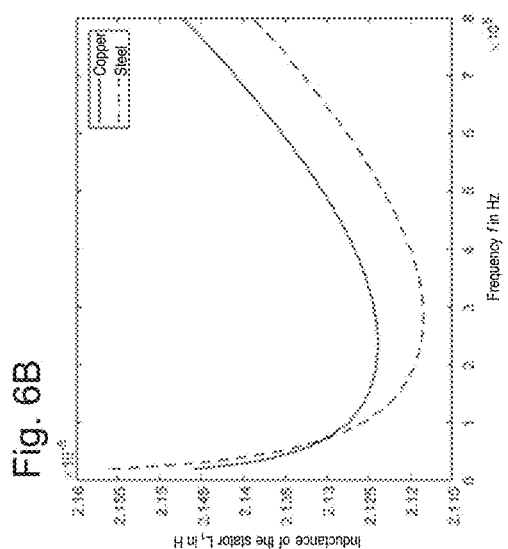
Fig. 6D
Fig. 6E
Fig. 6F

METHOD FOR INCREASING THE EFFICIENCY OF AN ENERGY TRANSFER DEVICE, ENERGY TRANSFER DEVICE, AND USE OF AN ELECTRICALLY CONDUCTIVE MATERIAL This non-provisional patent application claims priority to German Patent Application No. 10 2020 206 998.0, filed Jun. 4, 2020, and titled "Verfahren zur Steigerung der Effizienz einer Energieübertragungsvorrichtung, Energieübertragungsvorrichtung and Verwendung eines elektrisch leitfähigen Materials," the entire contents of which is incorporated herein by reference.

The invention relates to a method for increasing the efficiency of an energy transfer device, in particular for increasing the degree of efficiency of an energy transfer device and/or for reducing the heat generation in an energy transfer device. The invention further relates to an energy transfer device and a use of an electrically conductive material.

For rotating energy transfer devices, which themselves do not or cannot generate torque and which are used in an electrically excited synchronous machine, for example, great mechanical stability and low temperatures are important factors in order to achieve the highest possible degree of efficiency and a long service life. Furthermore, a small size is also desirable. In the case of contactless inductive energy transfer, there is the problem of undesired heat development due to eddy currents that are induced in the surrounding electrically conductive materials of the energy transfer device and that cause losses, in particular in the rotor and/or stator of the energy transfer device. It is therefore necessary to provide corresponding cooling of the energy transfer device, for example of the rotor and/or stator and/or the rotating shaft of the energy transfer device. This is also the reason why, in principle, no energy sources are desired on the rotor of an energy transfer device.

It is an object of the present invention to provide a method that reduces the heat generation in an energy transfer device. In addition, it is an object of the present invention to provide an energy transfer device with reduced heat generation. These objects are achieved by the subject matters of the independent claims. Advantageous embodiments are the subject of the subclaims.

An independent aspect for achieving the object relates to a method for increasing the efficiency of an energy transfer device with which electrical energy is converted wirelessly or contactlessly into electrical energy with the aid of a magnetic field in order to electrically excite a rotor, in particular an electrical machine, comprising the step of:

arranging an additional electrically conductive material layer on at least one active part of the energy transfer device, an active part of the energy transfer device being a part of the energy transfer device which is at least partially exposed to the magnetic field used for energy transfer, and wherein the electrical conductivity of the additional material layer is greater than the electrical conductivity of the at least one active part.

A further independent aspect for achieving the object relates to a method for increasing the efficiency of an energy transfer device with which energy is transferred wirelessly with the aid of a magnetic field, comprising the step of:

arranging an additional electrically conductive material layer on at least one active part of the energy transfer device, an active part of the energy transfer device being a part of the energy transfer device which is at least partially exposed to the magnetic field used for energy transfer, and wherein the electrical conductivity of the additional material layer is greater than the electrical conductivity of the at least one active part.

An "energy transfer device" in the context of the invention is in particular not understood to mean a generator or motor, but rather a device with which electrical energy is converted into electrical energy. Thus, in the context of the invention, "energy transfer device" is understood to mean in particular a device for the transfer of electrical energy, which itself cannot perform any mechanical work and/or cannot generate any torque.

Preferred embodiments of the aforementioned aspects will be given below.

The increase in efficiency of an energy transfer device comprises in particular an increase in the degree of efficiency of the energy transfer device and/or a reduction in the heat generation in the energy transfer device.

Arranging an additional electrically conductive material layer on at least one active part of the energy transfer device comprises in particular applying an additional electrically conductive material layer to at least one active part of the energy transfer device. In particular, an additional electrically conductive material layer can be added to at least one active part of the energy transfer device.

The energy transfer device can in principle be any energy transfer device in which energy is transferred wirelessly, i.e. inductively, with the aid of a magnetic field. The energy transfer device is in particular a rotating energy transfer device or a rotating energy transmitter. Consequently, the energy transfer device therefore preferably has a stator and a rotor. For example, the energy transfer device can be used for a generator or a motor or be part of a generator or a motor in which energy is transferred wirelessly, i.e. inductively, with the aid of a magnetic field. The energy transfer device can therefore also be referred to as an inductive energy transfer device. In particular, the energy transfer device can be part of an electrically excited synchronous machine. The energy transfer device could e.g. also be used for other purposes such as for robot joints. In other words, the energy transfer device could represent an energy transmitter or part of an energy transmitter, e.g. for robot joints. In particular, in the method according to the invention, the energy transfer device is provided before the application of the additional electrically conductive material layer.

The term "additional electrically conductive material layer" means that an electrically conductive material layer is used in addition to the already existing electrically conductive materials of the energy transfer device. An energy transfer device comprises a large number of electrically conductive components or materials that are used or are necessary for the intended function of the energy transfer device. For example, the stator, rotor or a shaft of the energy transfer device comprises electrically conductive materials that enable the fundamental function of the energy transfer device, namely to transfer energy. However, an "additional electrically conductive material layer" in the context of the present invention is not one of the materials provided or required for the basic operation of the energy transfer device. In addition to the already existing electrically conductive materials of the energy transfer device, the "additional electrically conductive material layer" rather represents an additional component that is not absolutely necessary for operation, but reduces heat build-up during operation of the energy transfer device and can increase the degree of efficiency of the energy transfer device.

The term "active part" (also "active component" or "active region") of the energy transfer device is understood to mean a part, a component or a region of the energy transfer device which at least partially is exposed to the magnetic field used for energy transfer. In particular, this means a part, a component or a region of the energy transfer device which is exposed to a magnetic field strength or magnetic flux density caused by the magnetic field used for energy transfer which is at least 1%, preferably at least 0.1%, and particularly preferably at least 0.01% of the magnetic field strength or magnetic flux density generated by the magnetic field used for energy transfer. In other words, an active part of the energy transmission system in the context of the present description is in particular a part, a component or a region of the energy transfer device which is exposed to the magnetic field used for energy transfer at least 1%, preferably at least 0.1%, and particularly preferably at least 0.01%, An active part is in particular a part, a component or a region of the energy transfer device which is located at a point in the energy transfer device where more than 1%, preferably more than 0.1%, and particularly preferably more than 0.01% of the maximum value of the magnetic flux density present in the system or energy transfer device is present. The above values relate to the magnetic flux density that is generated or can be measured by the coils of the energy transfer device in an air space without metallic components.

The additional electrically conductive material layer can e.g. be completely or partially made of copper with an electrical conductivity of $58 \cdot 10^6$ S/m, and/or silver with an electrical conductivity of $61 \cdot 10^6$ S/m and/or gold with an electrical conductivity of $45 \cdot 10^6$ S/m. Alternatively or in addition, for example, graphene with an electrical conductivity of $100 \cdot 10^6$ S/m could be used for the additional electrically conductive material layer.

Since copper and silver do not have sufficient mechanical stability in order to be used e.g. as the base material for a shaft or drive shaft of an electrically excited synchronous machine, and also for cost reasons, it is advantageous or necessary to form especially the rotating energy transfer device parts or components that are under a certain load from a more stable and cheaper material, such as steel. Compared to copper or silver, steel has only a low electrical conductivity (steel C35, for example, has an electrical conductivity of $8.6 \cdot 10^6$ S/m).

In the context of the present invention, it was found that the materials used in a rotating energy transfer device (e.g. for the stator, rotor and/or the shaft), which are exposed to the magnetic field generated for the energy transfer, can heat up strongly due to eddy currents induced in these materials due to the magnetic field. This also results in losses that reduce the degree of efficiency of the energy transfer system. The degree of heating in a material depends in particular on the electrical conductivity of the material. For materials with a relatively low electrical conductivity, such as steel, heating is usually higher than for materials with a higher electrical conductivity, such as copper or silver.

In order to reduce heating or heat generation, according to the invention, an additional highly conductive material layer can be arranged or applied to a less conductive material of the energy transfer device exposed to the magnetic field generated for energy transfer. Due to the so-called skin effect, it can advantageously be achieved that the magnetic field or alternating magnetic field used for the energy transfer penetrates less far into the material composite. This is because the so-called penetration depth δ of the magnetic field and thus also the eddy currents induced by the magnetic field into the material is smaller the smaller the specific electrical resistance is, i.e. the greater the electrical conductivity of the material is. This will be explained in more detail below. In particular, it can thus be achieved that eddy currents form mainly or exclusively in the additionally arranged, electrically highly conductive material layer, which advantageously further contributes to the fact that heating of the material composite is reduced by the eddy currents. "Material composite" is understood to mean a composite or a combination of the material to which the additional electrically conductive material layer is applied and the additional electrically conductive material layer.

Eddy currents form at high frequencies only on the surface of the material. The penetration depth δ (skin effect) determines how far an alternating magnetic field penetrates into an electrically conductive material and thus causes eddy currents. The penetration depth δ for round conductors is calculated as follows:

$$\delta = \sqrt{\frac{2\rho}{\omega\mu}},$$

where ρ is the specific electrical resistance of the conductor, ω is the angular frequency of the magnetic field, and μ is the absolute permeability of the conductor.

The penetration depth therefore depends on the material and the frequency. In the case of technically sensible structures (great mechanical stability) and high frequencies, the material used in an energy transfer device is generally thicker than the penetration depth δ and electrically conductive (e.g. steel shaft). Furthermore, due to the endeavor to keep the structural size small, it is usually not possible to choose the distance between the magnetic field and the electrically conductive material to be so large that the field strength and thus the strength of the eddy current are negligible. As a result, eddy currents cannot be avoided in systems of small construction size. With the present invention, however, it can be achieved that, on the one hand, the eddy currents penetrate into the material as little as possible and, on the other hand, form mainly or exclusively in the additionally arranged material layer, which reduces heating and thus also any energy or power losses. Consequently, the degree of efficiency of the energy transfer system can also be increased.

The following table shows an example of the relationship between the drop in the electric loading and the penetration depth (drop to 1/e, i.e. to approximately 37%) at different frequencies for a round copper conductor:

| Frequency | Penetration depth |
|---|---|
| 5 Hz | 29.7 mm |
| 16 Hz | 16.6 mm |
| 50 Hz | 9.38 mm |
| 160 Hz | 5.24 mm |
| 500 Hz | 2.97 mm |
| 1.6 kHz | 1.66 mm |
| 5 kHz | 938 μm |
| 16 kHz | 524 μm |
| 50 kHz | 297 μm |
| 160 kHz | 166 μm |
| 500 kHz | 93.8 μm |
| 1.6 MHz | 52.4 μm |
| 5 MHz | 29.7 μm |
| 16 MHz | 16.6 μm |
| 50 MHz | 9.38 μm |
| 160 MHz | 5.24 μm |
| 500 MHz | 2.97 μm |
| 1.6 GHz | 1.66 μm |

-continued

| Frequency | Penetration depth |
|---|---|
| 5 GHz | 938 nm |
| 16 GHz | 524 nm |
| 50 GHz | 297 nm |
| 160 GHz | 166 nm |
| 500 GHz | 93.8 nm |
| 1.6 GHz | 52.4 nm |

Typical operating frequencies for contactless inductive energy transfer are in the range of 50-500 kHz, which corresponds to a penetration depth for copper of 297-93 µm. The development in power electronics meanwhile allows higher frequencies, so that in the following a frequency of 500 kHz is considered. Furthermore, the coil system can also be optimized to a higher frequency, and thus the construction size of the coil and the capacitor can also be reduced. In the case of a smaller penetration depth δ associated with a higher frequency, the present invention has an even more advantageous effect.

Possible areas of application of the present invention are, for example, rotating energy transfer systems such as inductively supplied electrically excited synchronous machines, in particular in electromobility and robotics (e.g. robot joints).

In a preferred embodiment, the at least one active part of the energy transfer device is a component of a stationary primary side or a stator of the energy transfer device. Alternatively or in addition, the at least one active part of the energy transfer device is a component of a rotatable and/or rotating secondary side or a rotor of the energy transfer device. In other words, the at least one active part of the energy transfer device comprises a stator and/or a rotor of the energy transfer device. In particular, the at least one active part of the energy transfer device is a stator and/or a rotor of the energy transfer device. In the context of this invention, the term stator of the energy transfer device is in particular understood to mean a stationary primary side of the energy transfer device. In the context of this invention, the term rotor of the energy transfer device is in particular understood to mean a rotatable or rotating secondary side of the energy transfer device. In particular, the secondary side (or the rotor) of the energy transfer device is rotatable around the stationary primary side (or the stator).

In a further preferred embodiment, the at least one active part of the energy transfer device comprises a shaft or drive shaft or rotor shaft and/or a heat sink and/or a ferrite platelet and/or a housing and/or a ferrite disk and/or a cover and/or a stator winding and/or a rotor winding of the energy transfer device. In particular, the at least one active part of the energy transfer device is a shaft or drive shaft or rotor shaft and/or a heat sink and/or a ferrite platelet and/or a housing and/or a ferrite disk and/or a cover and/or a stator winding and/or a rotor winding of the energy transfer device. The shaft or rotor shaft can be a steel shaft, for example.

In a further preferred embodiment, the layer thickness of the arranged additional material layer is selected as a function of a predetermined frequency of the magnetic field used for energy transfer or the associated magnetic flux density. The predetermined frequency corresponds in particular to the operating frequency at which the energy transfer device is operated or is intended to be operated. In this way, the penetration depth of the magnetic field and thus the penetration depth of eddy currents induced by the magnetic field can be adjusted in such a way that the eddy currents form mainly or exclusively in the arranged additional material layer, i.e. penetrate into the active parts of the energy transfer system only to a small extent or not at all. Preferably, the layer thickness of the additional electrically conductive material layer is selected such that in the region of the arranged additional material layer at least 60%, in particular 63%, of the eddy currents induced by the magnetic field used for energy transfer are formed or occur in the additional material layer. More preferably, the layer thickness of the additional electrically conductive material layer is selected in such a way that in the region of the arranged additional material layer at least 70%, even more preferably at least 80%, even more preferably at least 90%, most preferably at least 95% and in particular at least 99% of the eddy currents induced by the magnetic field used for energy transfer are formed or occur in the additional material layer. Conversely, this means that the proportion of eddy currents generated by the magnetic field in the active part of the energy transfer system, i.e. in the materials on which the additional electrically conductive material was arranged or applied, is maximally 40%, preferably maximally 20%, even more preferably maximally 10%, and most preferably maximally 5%.

In a further preferred embodiment, the layer thickness of the arranged additional material layer corresponds to at least a penetration depth into the material of the additional material layer, caused by or as a result of the skin effect, at a predetermined frequency of the magnetic field used for energy transfer. The predetermined frequency corresponds in particular to the operating frequency at which the energy transfer system is operated or is intended to be operated. The layer thickness of the arranged additional material layer is preferably at least twice, more preferably three to five times, i.e. for example at least three times, at least four times or at least five times the penetration depth into the material of the additional material layer, caused by or as a result of the skin effect, at a predetermined frequency of the magnetic field used for energy transfer. With a material thickness that corresponds to the penetration depth caused by the skin effect, $1-1/e^1=63\%$ of the eddy currents generated are contained in the additional highly conductive material. With a layer thickness that corresponds to five times the penetration depth caused by the skin effect, $1-1/e^5=99.33\%$, i.e. approximately 99% of the eddy currents generated, are contained in the additional highly conductive material. In this way, any losses are advantageously generated mainly or only in the additional highly conductive material.

In a further preferred embodiment, the additional electrically conductive material layer has a relative permeability $\mu_r$ of approximately 1. In other words, the additional electrically conductive material layer does not have any increasing magnetic conductivity. In the context of the present invention, it was recognized that any eddy current losses can be kept low or minimized in this way. This knowledge arises from the following consideration:

Assuming that the material thickness $d_M$ is much greater than the penetration depth δ (i.e. $d_M \gg \delta$), the eddy current $I_W$ caused in the material is essentially constant and corresponds e.g. to the product N·I of winding number N and current I of a coil causing the eddy current. If the material thickness $d_M$ is much smaller than the penetration depth δ ($d_M \gg \delta$), the magnetic flux penetrates the material completely and the induced voltage $U_i$ only depends on the frequency ω, with $U_i \sim \omega$. For $d_M \gg \delta$, the eddy current losses $P_V$ can be specified as follows:

$$P_V = I_W^2 \cdot R_{M,eff}, \text{ with } R_{M,eff} \sim \frac{\rho}{\delta}$$

$$P_V \sim \sqrt{\mu \cdot \omega \cdot \rho}.$$

And for $d_M << \delta$, the eddy current losses $P_V$ can be specified as follows:

$$P_V = \frac{U_i^2}{R_{M,eff}}, \text{ with } R_{M,eff} \sim \frac{\rho}{d_M}$$

$$P_V \sim \frac{\omega^2}{\rho}.$$

Consequently, especially for the case $d_M >> \delta$ present in practice, the eddy current losses can be kept low if the additional electrically conductive material layer does not have an increasing magnetic conductivity, i.e. if the absolute magnetic permeability $\mu = \mu_r \cdot \mu_0$ essentially corresponds to the magnetic field constant $\mu_0$ and thus the relative permeability $\mu_r$ of the additional conductive material layer is approximately 1.

Alternatively or in addition, the additional electrically conductive material layer is arranged or applied to a non-conductive material of the at least one active part, which is arranged in a region of the energy transfer device that is to be shielded from the magnetic field used for energy transfer in an outer region of the energy transfer device.

In a further preferred embodiment, an in particular exposed surface of the arranged additional material layer is polished. A polished surface provides for a shorter path along which the eddy current propagates. Consequently, such polishing can advantageously further counteract heat generation.

In a further preferred embodiment, the additional electrically conductive material layer is applied to the at least one active part of the energy transfer device by pressing and/or welding and/or shrinking and/or electroplating.

In a further preferred embodiment, the at least one active part comprises a magnetic flux carrier element or magnetic flux guiding element with a ferrite-polymer composite material, with the additional electrically conductive material layer being arranged directly on the magnetic flux carrier element.

In a further preferred embodiment, the additional electrically conductive material layer is insulated from the at least one active part. Alternatively or in addition, the additional electrically conductive material layer is electrically insulated from the electrical machine. In particular, the additional electrically conductive material layer in the energy transfer device does not have to be electrically conductively connected to an active part. In other words, the additional electrically conductive material layer can be electrically insulated from the at least one active part and/or from the electrical machine or from components (in particular all components) of the electrical machine.

In a further preferred embodiment, the additional electrically conductive material layer has a layer thickness so that the additional electrically conductive material layer, in particular exclusively, shields a high-frequency intrinsic magnetic field of the energy transfer device. Alternatively or in addition, the additional electrically conductive material layer has a layer thickness so that the additional electrically conductive material layer has no effect with respect to an extrinsic magnetic field of the electrical machine. In other words, the layer thickness of the additional electrically conductive material layer within the energy transfer device is so pronounced that the additional electrically conductive material layer only shields the high-frequency intrinsic magnetic field of the energy transfer device and/or does not show any effect for the extrinsic magnetic field of the electrical machine, in particular due to a changed penetration depth. This can in particular be the case because the at least one externally arranged active part has a shielding effect against the extrinsic field of the electrical machine, and/or the extrinsic electrical field is low-frequency such that it permeates the materials in the energy transfer device, including the additional electrical conductive material layer, completely due to the penetration depth.

A further independent aspect for achieving the object relates to an energy transfer device for the wireless or contactless conversion of electrical energy into electrical energy with the aid of a magnetic field in order to electrically excite a rotor (in particular an electrical machine), characterized in that an additional electrically conductive material layer is arranged on at least one active part of the energy transfer device, an active part of the energy transfer device being a part of the energy transfer device which is at least partially exposed to a magnetic field used for energy transfer, and wherein the electrical conductivity of the additional material layer is greater than the electrical conductivity of the at least one active part.

The energy transfer device can further comprise at least one electronics device (in particular comprising a primary-side and/or secondary-side electronics device). The electronics device comprises in particular at least one compensation unit, an inverter and/or a rectifier.

The energy transfer device preferably comprises a primary-side electronics device with an inverter (in particular single-phase) and/or a secondary-side electronics device with a rectifier. The primary-side electronics device further preferably has a primary-side compensation unit, in particular a primary-side reactive power compensation unit. The secondary-side electronics device further preferably has a secondary-side compensation unit, in particular a secondary reactive power compensation unit. The secondary-side electronics device is preferably configured to be arranged on and/or outside the machine rotor shaft. In particular, the secondary-side electronics device is arranged on and/or outside a machine rotor shaft. For example, the secondary-side electronics device can be configured to be arranged in the region of a bearing of the machine rotor shaft and/or in the region of the exciter winding of the machine rotor. In particular, the secondary-side electronics device is arranged in the region of a bearing of the machine rotor shaft and/or in the region of the exciter winding of a machine rotor.

A further independent aspect for achieving the object relates to an energy transfer device for the wireless transfer of energy with the aid of a magnetic field, characterized in that an additional electrically conductive material layer is arranged on at least one active part of the energy transfer device, an active part of the energy transfer device being a part of the energy transfer device which is at least partially exposed to a magnetic field used for energy transfer, and wherein the electrical conductivity of the additional material layer is greater than the electrical conductivity of the at least one active part.

The energy transfer device in particular has a rotor winding or rotor coil and a stator winding or stator coil. The rotor coil and stator coil are in particular arranged to be rotatable with respect to one another. In particular, the rotor coil and stator coil are arranged relative to one another such that no current is induced when the coils rotate relative to one another. Both the rotor coil and the stator coil of the energy transfer system can each be a primary coil or a secondary coil. In order to generate current in the secondary coil, an AC voltage is applied to the primary coil. A relative rotation between the primary coil and the secondary coil is not necessary though. In particular, the primary and secondary coils can be cylindrical and/or arranged cylindrically with respect to one another.

The energy transfer device can in particular comprise a coil system, one coil of the coil system belonging to a primary side or a primary system of the energy transfer device and a further coil of the coil system belonging to a primary side or a secondary system of the energy transfer device. The primary system can comprise a voltage source, an inverter, and a primary-side compensation unit. The secondary system can comprise a secondary-side compensation unit and a rectifier. In particular, the inverter and the primary-side compensation unit can form a primary-side electronics device. An energy or voltage source can also be part of the primary-side electronics device. Furthermore, the secondary-side compensation unit 27 and the rectifier 26 can form a secondary-side electronics device.

Compensation can be realized using various compensation circuits, such as a serial circuit, a parallel circuit, an LC circuit or an LCC circuit. Preferably, a resonant circuit is used for the energy transfer device, which is compensated serially on the primary side and in parallel on the secondary side. In a further embodiment, the circuit can be compensated serially on the primary side and uncompensated on the secondary side. And in a further embodiment, the circuit can be non-resonant and uncompensated on both sides.

Preferred embodiments of the aforementioned aspects will be given below.

In a further preferred embodiment, the energy transfer device has a stator and a rotor, the at least one active part of the energy transfer device being a component of the stator and/or rotor.

In a further preferred embodiment, the at least one active part of the energy transfer device comprises or is a rotor shaft, in particular a steel shaft, and/or a stator winding.

In a further preferred embodiment, the layer thickness of the arranged additional material layer is selected as a function of a predetermined frequency of the magnetic field used for energy transfer.

In a further preferred embodiment, the layer thickness of the additional material layer is selected such that eddy currents are formed by the magnetic field substantially only or exclusively in the additional material layer and not in the active component.

In a further preferred embodiment, an in particular exposed surface of the arranged additional material layer is polished.

In a further preferred embodiment, the energy transfer device according to the invention is a device for converting electrical energy into electrical energy, the conversion taking place in particular via an air gap. The energy transfer device according to the invention can e.g. be a component of an electrically excited synchronous machine. In particular, the energy transfer device according to the invention can be used for the electrical excitation of an electrically excited synchronous machine. In particular, the energy transfer device can replace a conventional slip ring system of the synchronous machine, which is used to excite the rotor of the synchronous machine. Similar to the slip ring, the energy transfer device can be used to energize or excite the rotor winding of the synchronous machine. In particular, the present invention relates to a use of the energy transfer device according to the invention for the electrical excitation of an electrically excited synchronous machine. Furthermore, within the scope of the present invention, in particular a synchronous machine comprising the energy transfer device according to the invention is provided.

In a further preferred embodiment, the at least one active part comprises a magnetic flux carrier element with a ferrite-polymer composite material, with the additional electrically conductive material layer being arranged directly on the magnetic flux carrier element.

A further independent aspect for achieving the object relates to the use of an electrically conductive material in an energy transfer device, with which—with the aid of a magnetic field—electrical energy is converted wirelessly or contactlessly into electrical energy in order to electrically excite a rotor (in particular an electrical machine), characterized in that the electrically conductive material is arranged as an additional material layer on at least one active part of the energy transfer device, an active part of the energy transfer device being a part of the energy transfer device which is at least partially exposed to a magnetic field used for energy transfer, and wherein the electrical conductivity of the additionally applied material layer is greater than the electrical conductivity of the at least one active part.

A further independent aspect for achieving the object relates to the use of an electrically conductive material, such as copper or silver, in an energy transfer device, with which energy is transferred wirelessly with the aid of a magnetic field. The electrically conductive material is arranged as an additional material layer on at least one active part of the energy transfer device and/or applied to at least one active part of the energy transfer device, with an active part of the energy transfer device being a part of the energy transfer device which is at least partially exposed to the magnetic field used for energy transfer, and wherein the electrical conductivity of the electrically conductive material or the additionally arranged material layer is greater than the electrical conductivity of the at least one active part. The application of the additional electrically conductive material layer to the at least one active part takes place in particular by pressing, welding, shrinking and/or electroplating.

Preferred embodiments of the aforementioned aspects will be given below.

In a preferred embodiment, the active part of the energy transfer device comprises at least one magnetic flux carrier element with a magnetic conductivity or relative permeability of less than 2000, preferably less than 1000, particularly preferably less than 500 and in particular less than 100. The at least one magnetic flux carrier element thus has a lower magnetic conductivity than "classic ferrite". In the context of this description, "classic ferrite" is understood to mean in particular an electrically poorly or non-electrically conductive ferromagnetic ceramic material of the iron oxide hematite ($Fe_2O_3$) or magnetite ($Fe_3O_4$) and other metal oxides. For example, the at least one magnetic flux carrier element comprises or is a so-called ferrite composite, i.e. in particular a ferrite-polymer mixture or a ferrite-polymer composition or a ferrite-polymer composite. In particular, the at least one magnetic flux carrier element is at least partially formed from a ferrite composite. Such a ferrite composite can be designed to be dimensionally stable or flexible or deformable. For example, the at least one magnetic flux carrier element comprises or is at least one ferrite mat or ferrite foil, which in particular comprises a ferrite composite (or a plastic mixture and/or a polymer). In particular, such a ferrite mat is designed to be flexible or deformable. For example, the at least one magnetic flux carrier element sold by the company BARLOG Plastics GmbH under the trade name "KEBABLEND" (in particular for the production of injection-molded magnets and soft magnetic components) can include functional compounds or ferrite composites. The at least one magnetic carrier element preferably has a carrier polymer (e.g. PP, PA6, PA12, PPS or PPA). Hard ferrite compounds (e.g. Sr or Ba ferrites), rare earth compounds (e.g. NdFeB, SmCo or SmFeN) or various soft magnetic fillers (e.g. Fe or soft magnetic ferrites) can be arranged or applied to this carrier polymer. Such ferrite composites generally have a significantly lower magnetic conductivity compared to classic ferrite, in particular in the range from $\mu_r=60$ to $\mu_r=100$.

The electrically conductive material is preferably arranged as an additional material layer, in particular directly or immediately, on the at least one magnetic flux carrier element and/or applied to the at least one magnetic flux carrier element.

In a further preferred embodiment, the at least one active part comprises a magnetic flux carrier element with a ferrite-polymer composite material, the additional electrically conductive material layer being arranged directly on the magnetic flux carrier element.

The statements made above or below on the embodiments of the first aspect also apply to the above-mentioned further independent aspects and in particular to the respective preferred embodiments. In particular, the statements made above and below on the embodiments of the respective other independent aspects also apply to an independent aspect of the present invention and to respective preferred embodiments.

In the following, individual embodiments for solving the object will be described exemplarily with the aid of the figures. Some of the individual embodiments described have features that are not absolutely necessary in order to carry out the claimed subject matter, but that provide the desired properties in certain applications. Embodiments not including all the features of the embodiments described below should also be seen as being disclosed by the technical teaching described. Furthermore, in order to avoid unnecessary repetition, certain features are only mentioned in relation to some of the embodiments described below. It should be noted that the individual embodiments should therefore not only be viewed individually, but be viewed together. On the basis of this overview, the person skilled in the art will recognize that individual embodiments can also be modified by including individual or multiple features of other embodiments. It is pointed out that a systematic combination of the individual embodiments with one or more features described in relation to other embodiments can be desirable and useful and therefore be considered and also be regarded as included in the description.

BRIEF DESCRIPTION OF THE DRAWINGS

FIGS. 6A-6F shows measurement results obtained for the energy transfer device 100 according to FIG. 5a or 5b. The diagrams each show the result of a measurement for the energy transfer device using a steel shaft 12 without an additional copper sheath 13 and using a steel shaft 12 with an additional copper sheath 13. Here, FIG. 6a shows the quality of the stator as a function of the magnetic field frequency, FIG. 6b shows the inductance of the stator as a function of the magnetic field frequency, FIG. 6c shows the quality of the rotor as a function of the magnetic field frequency, FIG. 6d shows the inductance of the rotor as a function of the magnetic field frequency, FIG. 6e shows the quality of the entire system as a function of the magnetic field frequency, and FIG. 6f shows the theoretically achievable degree of efficiency as a function of the magnetic field frequency;

DETAILED DESCRIPTION OF THE DRAWINGS

Figure 1:
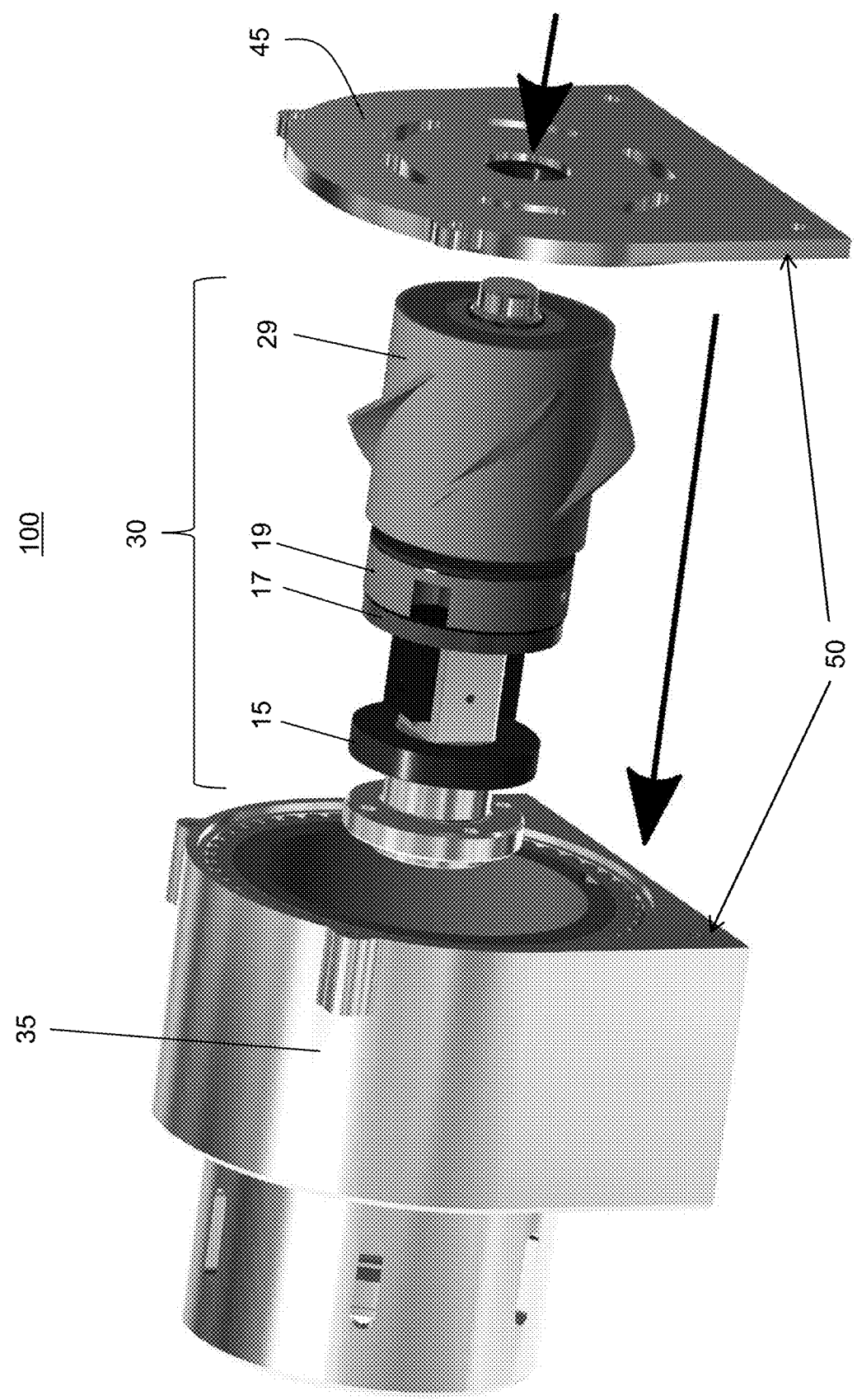
FIG. 1 shows a schematic drawing of an exemplary energy transfer device 100 in an exploded view.
Figure 2:
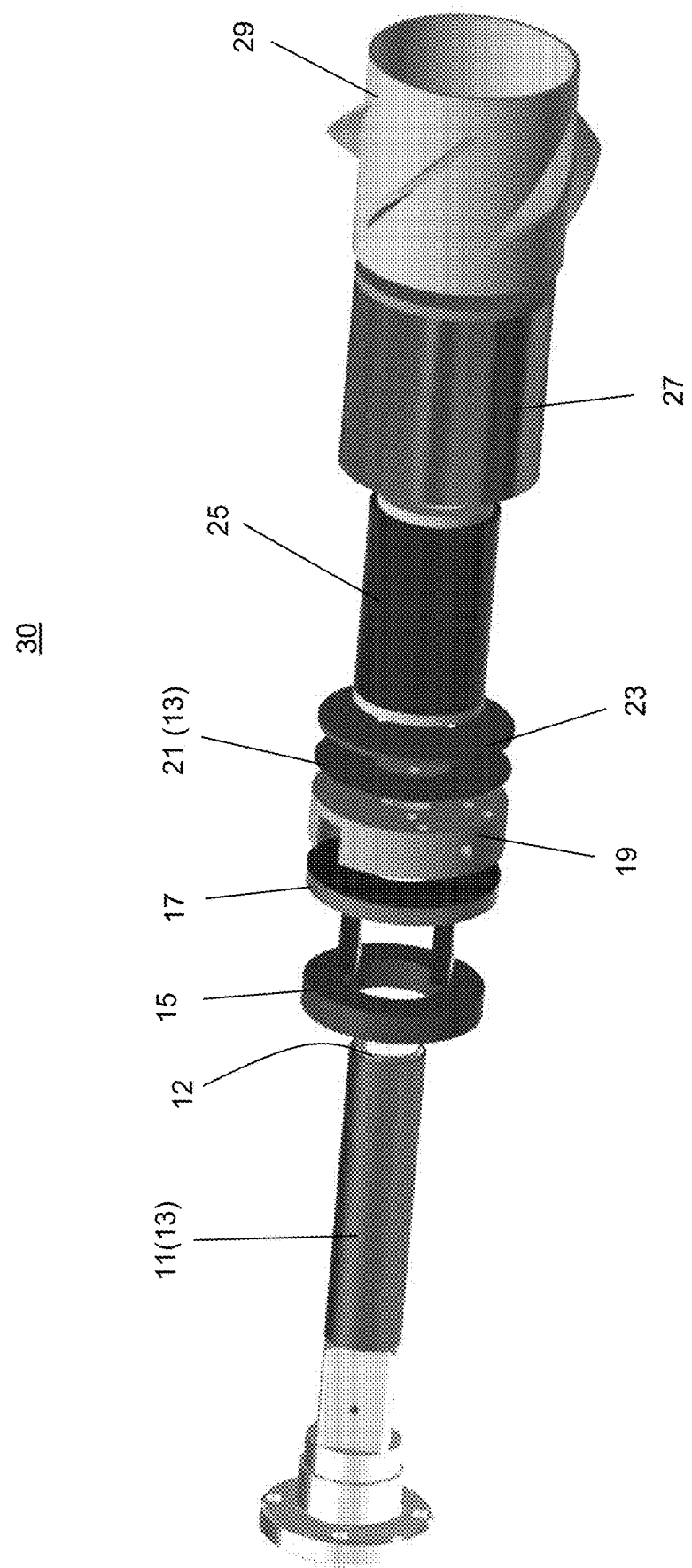
FIG. 2 shows a schematic drawing of a rotor 30 of the energy transfer device 100 of FIG. 1 in an exploded view.
Figure 3:
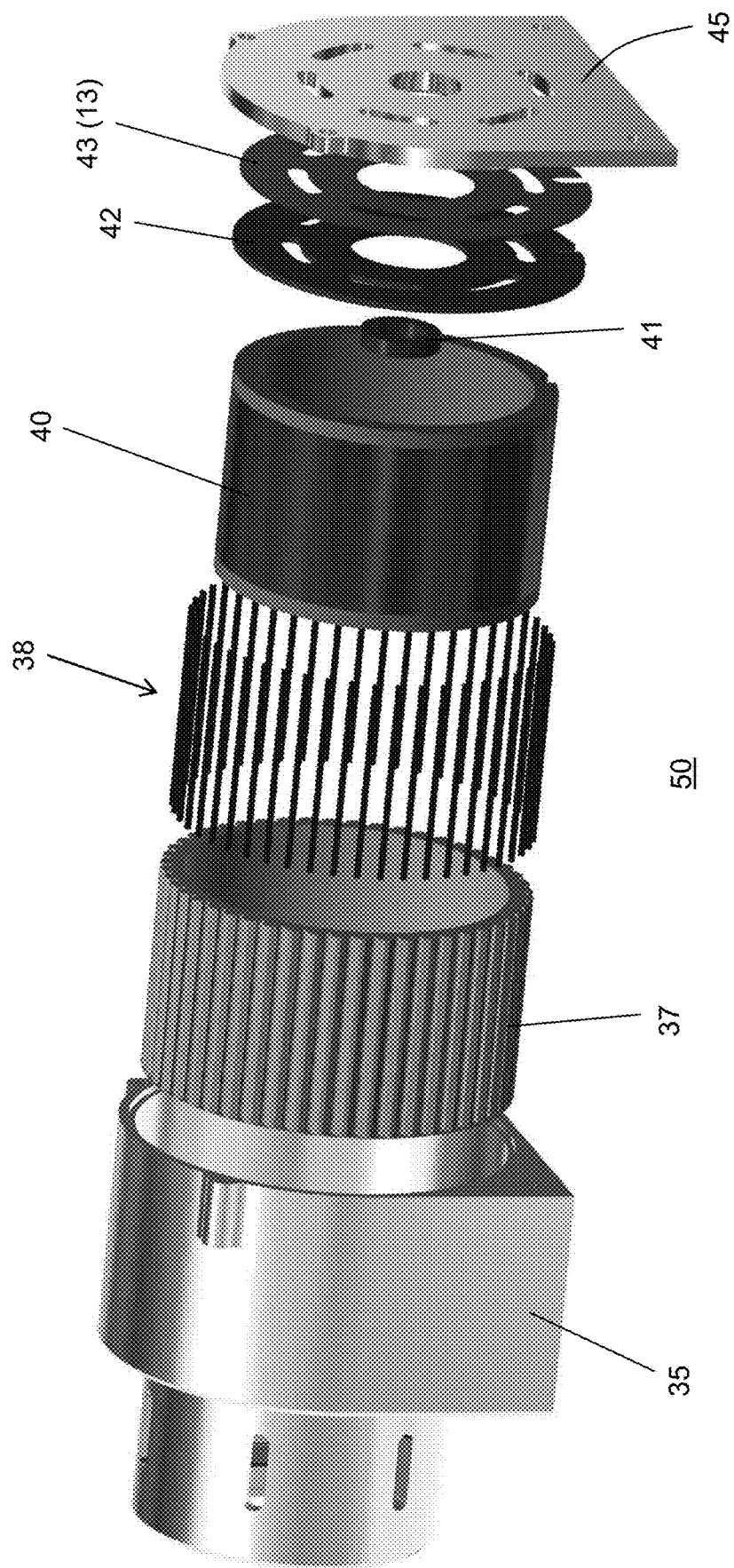
FIG. 3 shows a schematic drawing of a stator 50 of the energy transfer device 100 of FIG. 1 in an exploded view.

FIG. 1 shows a schematic drawing of an exemplary energy transfer device 100 with a rotor 30 and a stator 50. A ball bearing 15, a circuit board with insulating foil 17, a heat sink or cooling element 19, and a rotor sleeve 29 of the rotor 30 can be seen in FIG. 1. Further components of the rotor 30 are shown in FIG. 2. Only a housing 35 and a cover 45, which can be mounted onto the housing 35, of the stator 50 can be seen in the figure. Further components of the stator 50 are shown in FIG. 3. The arrows shown indicate a mounting direction for mounting or joining the individual components of the energy transfer device 100 together.

FIG. 2 shows a schematic exploded view of the rotor 30 of the energy transfer device 100 of FIG. 1, In addition to the components already apparent from FIG. 1, i.e. the ball bearing 15, the circuit board with insulating foil 17, the heat sink 19, and the rotor sleeve 29, a rotor winding 27 with plastic carrier, an (optional) ferrite platelet 23, an (optional) ferrite mat 25 with plastic carrier, a (steel) shaft 12 with an additional copper sleeve 11, and an additional copper platelet 21 arranged between the heat sink 19 and the ferrite platelet 23 can be seen in the Figure. The additional copper sleeve 11 of the (steel) shaft 12 and the additional copper platelet 21 are additional electrically conductive material layers 13 that are attached to active parts of the energy transfer device 100 or the rotor 30 of the energy transfer device 100, namely are arranged on and/or attached to the shaft 12 and on the heat sink 19 (made of aluminum). These additionally arranged or applied conductive material layers 13 serve to reduce losses in the steel shaft 12 and in the aluminum heat sink 19. The electrical conductivity of the arranged additional material layer 13 (here copper) is higher than the electrical conductivity of the respective active parts 12 and 19 (steel, aluminum). By the additionally used or arranged or applied electrically conductive material layer 13 (here copper), it can advantageously be achieved that the magnetic field used for the energy transfer and thus the eddy currents induced by the magnetic field penetrate less far or ideally even not at all into the materials of the active parts 12 and 19 (skin effect). Any eddy currents generated in these regions develop mainly or only in the additionally arranged material layer 13, i.e. the copper sleeve 11 or the copper platelet 21. Due to the high or higher electrical conductivity of the additionally arranged material layer 13 compared to the electrical conductivity of the active parts, the eddy currents induced by the magnetic field cause lower losses and/or lower heat generation. In particular, the active parts are heated to a lesser extent due to the arranged additional copper layer than in the case that no such copper layer 13 is used. The degree of efficiency of the energy transfer device 100 can thus be increased.

Instead of using a ferrite (or the ferrite platelet 23 and/or the ferrite mat 25), it can be advantageous to use an electrically and magnetically non-conductive material, in particular plastic. In particular by arranging such a non-conductive material (such as plastic) between the additional electrically conductive material layer 13 and a coil of the energy transfer device 100 can a distance between the additional electrically conductive material layer 13 and the coil be established or maintained. In other words, a non-conductive material, e.g. in the form of a spacer element, can be arranged between the additionally electrically conductive material layer 13 and a coil of the energy transfer device 100. The non-conductive material, in particular the spacer element made of non-conductive material, can e.g. comprise plastic or consist entirely of plastic. The non-conductive material, in particular the spacer element made of non-conductive material, can e.g. be ferrite-free, i.e. do not contain ferrite and preferably no composite material comprising ferrite. Thus, the non-conductive material, in particular the spacer element, can differ from a ferrite mat, since the non-conductive material is free of ferrite composites, i.e. does not have any ferrite composites. In the context of the present invention, it was found that such a distance advantageously leads to the fact that losses that would occur upon direct arrangement or application of the coil to the additional electrically conductive material layer 13 can be reduced or avoided. In addition, by using plastic instead of ferrite, the material costs can be reduced. Especially if the additional electrically conductive material layer 13 is a copper layer can it be advantageous to use a non-conductive plastic instead of the ferrite, in particular in such a way that a distance between the copper layer and the coil, as would also be the case when ferrite was used, is maintained.

FIG. 3 shows a schematic exploded view of the stator 50 of the energy transfer device 100 of FIG. 1. In addition to the components already evident from FIG. 1, i.e. the housing 35 and the cover 45, a ferrite carrier 37, ferrite rods 38, a stator winding with plastic carrier 40, a bearing 41, an (optional) ferrite disk 42, and an additional copper disk 43 can be seen in the Figure. The copper disk 43 is arranged between the (optional) ferrite disk 42 and the cover 45, The copper disk 43 is an additional electrically conductive material layer 13 arranged on or applied to an active part of the energy transfer device 100 or the stator 50 of the energy transfer device 100, namely on the cover 45. The electrical conductivity of the arranged additional material layer 13 (here copper) is higher than the electrical conductivity of the active part 45 (aluminum). By the additionally used or arranged or applied electrically conductive material layer 13 (here copper), it can advantageously be achieved that the magnetic field used for the energy transfer and thus the eddy currents induced by the magnetic field penetrate less far or ideally even not at all into the material of the active part, i.e. here the aluminum cover 45 (skin effect). Any eddy currents generated in this region develop mainly or only in the additionally arranged material layer 13, i.e. the copper disk 43.

Due to the high or higher electrical conductivity of the additionally arranged material layer 13 compared to the electrical conductivity of the active part, the eddy currents induced by the magnetic field cause lower losses and/or lower heat generation. In particular, the arranged additional copper layer 13 heats the active parts less than if no such copper layer is used. The degree of efficiency of the energy transfer device 100 can thus be increased.

The ferrite layers serve to carry the flux. Their use shortens the length of a magnetic field line, which increases the inductance of the windings. In the ferrite there is a small proportion of magnetic reversal losses. Ferrite consists of very small particles the electrical conductivity of which does not cause eddy currents even at high frequencies (e.g. 500 kHz). Laminated iron as a flux carrier, such as electrical sheet in machines, is not suitable as a flux carrier, especially at high frequencies of inductive energy transfer. For this reason, ferrite is mostly used. In practice, due to the finite magnetic conductivity, a flux carrier never diverts all field lines, i.e. a field can still be measured behind a flux carrier. This field then encounters other materials or active parts. Furthermore, there are regions that cannot be provided with a flux carrier using classic ferrite. In addition to the classic ferrite rods shown (a brittle material similar to ceramics that cannot be milled and therefore only allows restricted geometries), two new types of materials are currently used, namely

- a flexible ferrite mat (in particular comprising a flexible or soft and/or rubber-like ferrite composite, see the ferrite mat 25 in FIG. 2), which comprises a polymer or a rubber-like plastic mixture, and/or
- dimensionally stable ferrite composites, i.e. in particular a ferrite-polymer composite material that can be milled and manufactured e.g. by injection molding.

Both materials, which in particular comprise a carrier polymer and a magnetic material, or in particular are composed of a carrier polymer and a magnetic material, have a magnetic conductivity (relative permeability) in the range from $\mu_r=60$ to $\mu_r=100$. In contrast, there is classic ferrite with $\mu_r=2000$. The use of classic ferrite is problematic in rotating systems due to mechanical loads such as vibrations, etc. As a result of the loads, the material can break and, after breaking, sometimes has poor properties. If the above-mentioned novel ferrite materials are used (as shown in FIGS. 2 and 3), the necessary stability can be achieved. In addition, more flexible geometries are possible.

As already indicated above, these new types of ferrite materials, however, have a much lower magnetic conductivity or permeability $\mu$ compared to classic ferrite, which means a higher penetration depth $\delta$ according to the formula mentioned above. For this reason, it is advantageous to apply an additional highly conductive layer to poorly conductive materials, in particular if there is additional magnetic conductivity (e.g. steel).

The conductive surfaces copper, aluminum or silver generally serve to shield the flux; they also change the path of the magnetic field lines. However, eddy currents arise which, depending on the conductivity of the material, cause losses of different levels. Highly conductive materials shield the field completely if they are sufficiently thick (see the table above). The use of highly conductive materials copper/silver significantly reduces losses compared to steel. If aluminum is used, the reduction is less but still significant. Drive shafts for electrical machines are mostly made of steel. Housings are mostly made of aluminum, in the case of steel housings an additional highly conductive layer would be imperative. In both cases, the use of additional thin copper/silver layers reduces the heat generation.

The additional highly conductive material layers 13 can be arranged or applied to the at least one active part by pressing and/or welding and/or shrinking etc. with a layer thickness greater than three to five times the penetration depth δ. Typically, e.g. in the case of low frequencies (e.g. 50 kHz), a copper sheet with a material thickness of 1.5 mm must be used so that the eddy current only spreads completely in the highly conductive material. The electric loading with regard to the penetration depth drops with 1/e, so that a copper sheet with a thickness of 297 µm already achieves a reduction of 63% in the case mentioned (see table above). It goes without saying that these values are only intended as an example. Strictly speaking, the above formula for the penetration depth only applies to round copper conductors; in the case of copper surfaces, the penetration depth must be calculated separately. In the context of this invention, however, this is a negligible correction. Alternatively, e.g. a layer with a smaller layer thickness (e.g. in the range of 100-300 µm) of the electrically highly conductive material can be applied by electroplating etc. For example, silver on steel or aluminum is suitable for this. The thin layer is sufficient for frequencies around 500 kHz. Electroplating with copper can also take place, but the result is better for silver due to the higher conductivity.

Figure 4A:
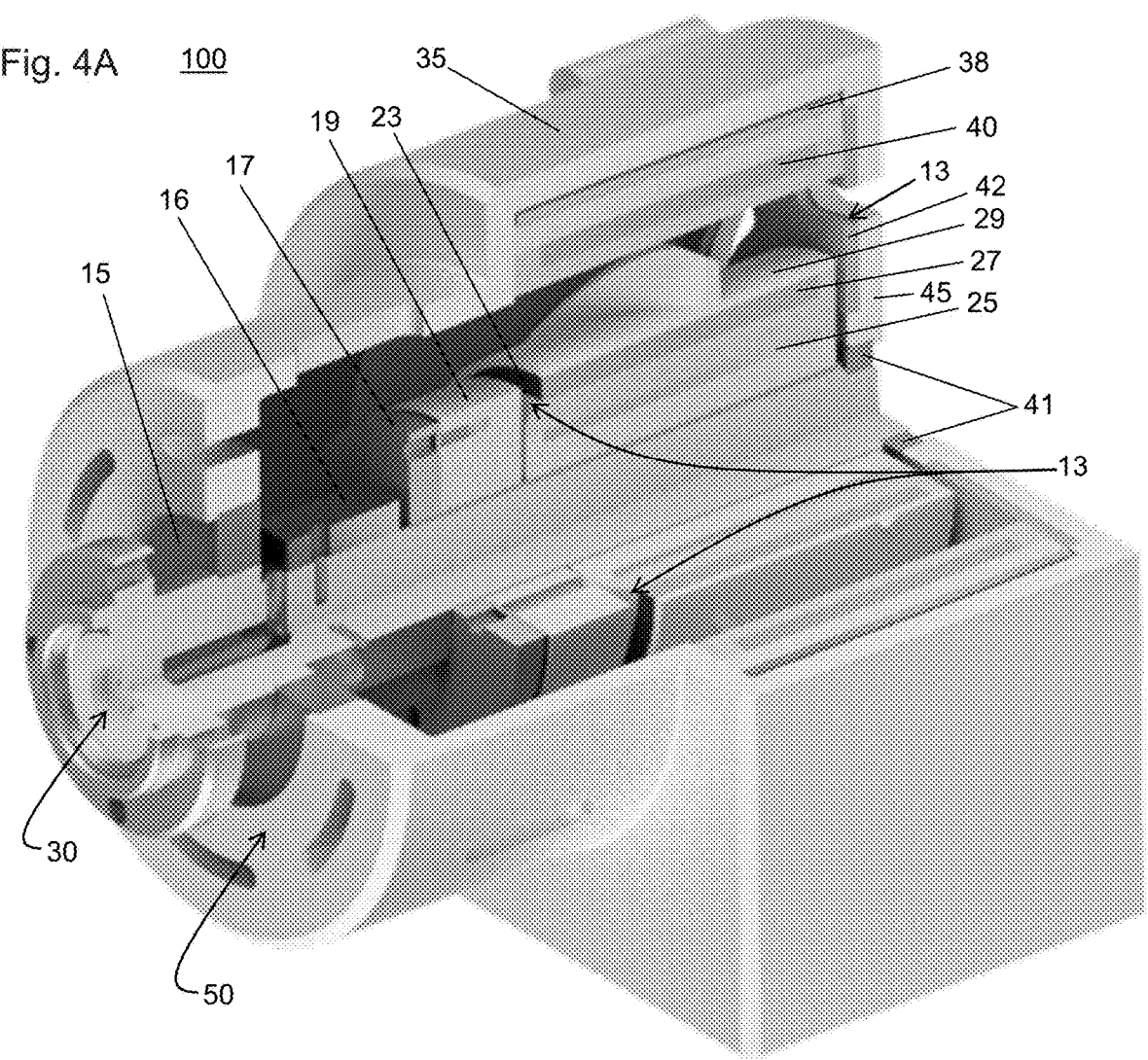
FIG. 4A shows a schematic drawing of a section through an exemplary energy transfer device 100 in a mounted state.

FIG. 4a shows a schematic drawing of a section through an exemplary energy transfer device 100 in the mounted state. A mounted state is understood to mean that the rotor 30 and the stator 50 of the energy transfer device 100 are assembled or put together. The components of the energy transfer device 100 shown in FIG. 4a correspond to the components already shown in FIGS. 1 to 3.

In particular, the rotor 30 with the bearing 15, the circuit board with insulating foil 17, the heat sink 19, the ferrite mat 25, the rotor winding 27, and the rotor sleeve 29 can be seen in FIG. 4a. The circuit board 17, which is arranged on a semiconductor material 16, comprises in particular a rectifier. The rotor winding 27 is arranged between the rotor sleeve 29 and the ferrite mat 25. A ferrite platelet 23 (only indicated in FIG. 4a) can be arranged between the heat sink 19 and the rotor sleeve 29. As also indicated in FIG. 4a, an additional electrically conductive material layer 13, in particular in the form of a copper platelet 21 (see FIG. 2), is arranged between this ferrite platelet 23 and the heat sink 19, for example. This additional electrically conductive material layer 13, which is arranged directly on the heat sink 19, serves in particular to reduce losses in the heat sink 19.

Furthermore, the stator 50 with the housing 35, the ferrite rods 38, the stator winding 40, the bearing 41, the (optional) ferrite disk 42, and the cover 45 can be seen in FIG. 4a. As indicated in FIG. 4a, an additional electrically conductive layer 13, in particular in the form of a copper disk 43 (see FIG. 3), can be arranged between the ferrite disk 42 and the cover 45. The additional electrically conductive material layer 13, which is arranged directly on the cover 45, serves in particular to reduce losses in the cover 45. The ferrite platelet 23, the ferrite mat 25, and the ferrite disk 42 each serve to carry the magnetic flux. Each of these elements can thus generally also be referred to as a magnetic flux carrier element.

Figure 4B:
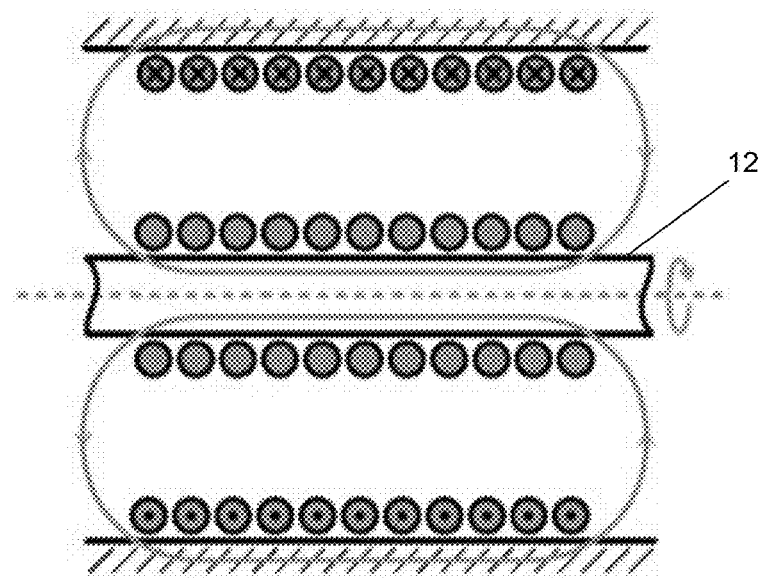
FIG. 4B shows a schematic drawing of an exemplary winding arrangement for generating a magnetic field used for energy transfer.

FIG. 4b is a schematic drawing of an exemplary winding arrangement for generating a magnetic field used for energy transfer. As shown in the drawing, the rotor shaft 12 is exposed to the magnetic field, i.e. the magnetic field or the flux lines connected to it penetrate into the rotor shaft 12. According to definition, the rotor shaft 12 is therefore an active part of the energy transfer device 100. The same applies to the above-mentioned components, i.e. e.g. for the heat sink 19 and the ferrite platelet 23 of the rotor 30 as well as for the ferrite platelet 42 and the cover 45 of the stator 50.

Figure 5A:
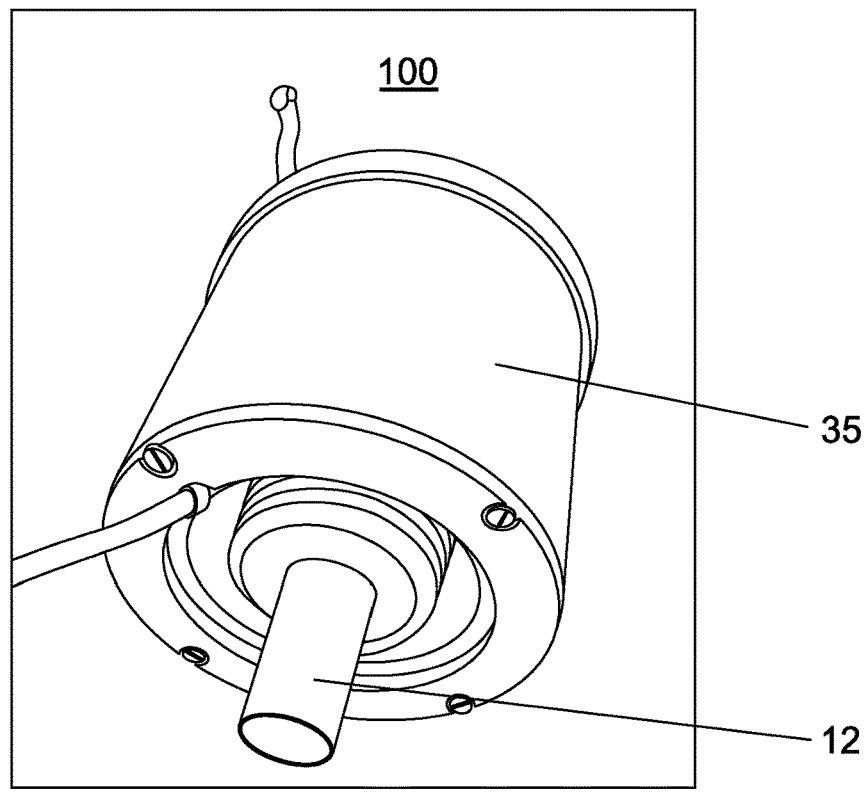
FIG. 5A shows a photograph of a further exemplary energy transfer device 100 used for experimental purposes within the scope of the present invention.
Figure 5B:
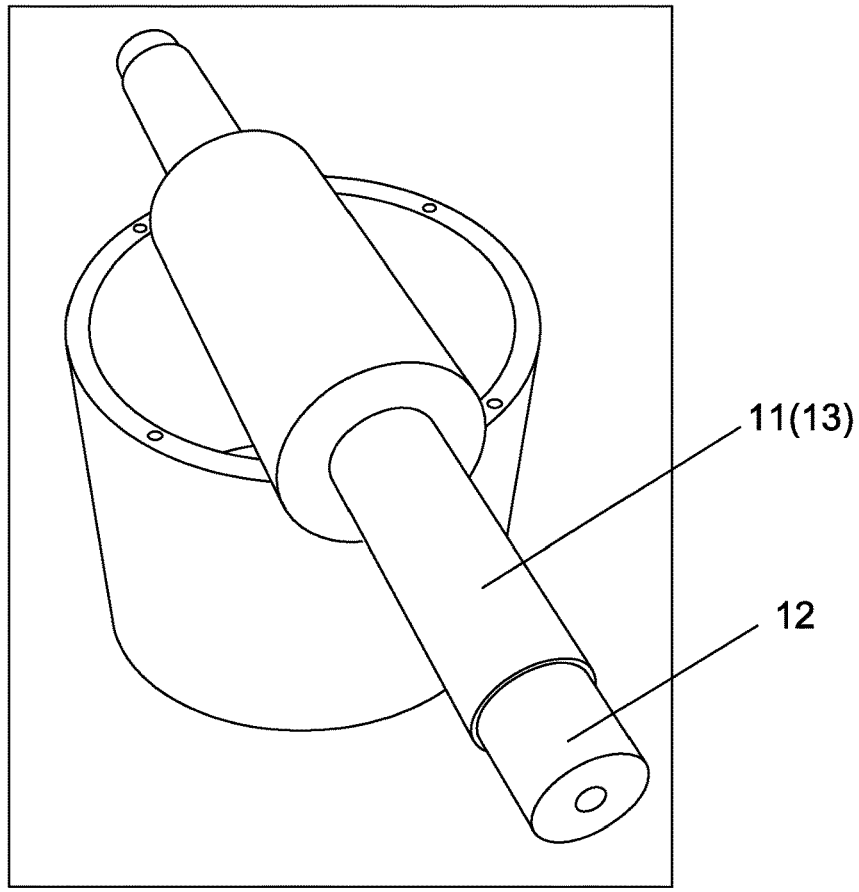
FIG. 5B shows a further photograph of an exemplary energy transfer device used for experimental purposes within the scope of the present invention, in particular a rotor shaft 12 of the energy transfer device 100, which is provided with an additional copper sheath 13.

FIGS. 5a and 5b show photographs of a further exemplary energy transfer device 100 used for test or measurement purposes within the scope of the present invention. In particular, a stator housing 35 and a rotor shaft 12 can be seen in FIG. 5a. In contrast to FIG. 5a, the steel shaft 12 in FIG. 5b is provided with an additional copper sheath 13. Various parameters were performed on this energy transfer device 100 as a function of the frequency of the magnetic field used for energy transfer, respectively without the additional copper sheath 13 of the steel shaft 12 (see FIG. 5a) and with the additional copper sheath 13 of the steel shaft 12 (see FIG. 5b). The measurement results are shown in FIGS. 6a-f.

FIGS. 6a-f show measurement results obtained by measuring the energy transfer device 100 shown in FIGS. 5a and 5b. The diagrams each show the result of a measurement for the energy transfer device 100 using a steel shaft 12 without an additional copper sheath 13 (dashed curve) and using a steel shaft 12 with an additional copper sheath 13. FIG. 6a shows the quality of the stator as a function of the magnetic field frequency, FIG. 6b shows the inductance of the stator as a function of the magnetic field frequency, FIG. 6c shows the quality of the rotor as a function of the magnetic field frequency, FIG. 6d shows the inductance of the rotor as a function of the magnetic field frequency, FIG. 6e shows the quality of the entire system as a function of the magnetic field frequency, and FIG. 6f shows the theoretically achievable degree of efficiency as a function of the magnetic field frequency. FIGS. 6a-f thus illustrate the experimental comparison between a steel shaft and a copper-coated shaft. The quality Q shown is defined with Q $$Q = \frac{2\pi \cdot f \cdot L}{R},$$

where f is the frequency of the magnetic field used for energy transfer, L is the inductance of a coil of the energy transfer device (in particular the inductance of the coil used to generate the magnetic field) and R is a resistance, the resistance R being composed of the DC line resistance, the hysteresis losses in e.g. iron, and the eddy current losses.

In the measurement setup, the quality Q improves due to the additional copper layer used, mainly due to the lower eddy current losses. The coil was not changed in the measurement setup, only the shaft material was replaced. A system basically has fewer losses if the quality is higher. An ideal coil does not have any resistance and has a quality that tends toward infinity (superconducting coil). From FIGS. 6a, 6c, and 6e it can be seen that the quality of the stator, the quality of the rotor, and the quality of the entire system (i.e. rotor and stator) is higher when using a steel shaft 12 with an additional copper coating 13 over the entire frequency range (from 0 to $8*10^5$ Hz) than when using a steel shaft 12 without an additional copper coating 13. In this case, the quality of the system is improved by more than 50%. According to FIG. 6f, the degree of efficiency is higher when using a steel shaft 12 with an additional copper coating 13 over the entire frequency range (from 0 to $8*10^5$ Hz) than when using a steel shaft 12 without an additional copper coating 13. During operation under load, there was a clear advantage in terms of heat generation for the highly conductive material (copper) compared to the other configurations (steel). When the additional copper layer was used, 1200 W of power was transferred in the prototype without showing any significant heating in the rotor and/or stator.

Figure 7:
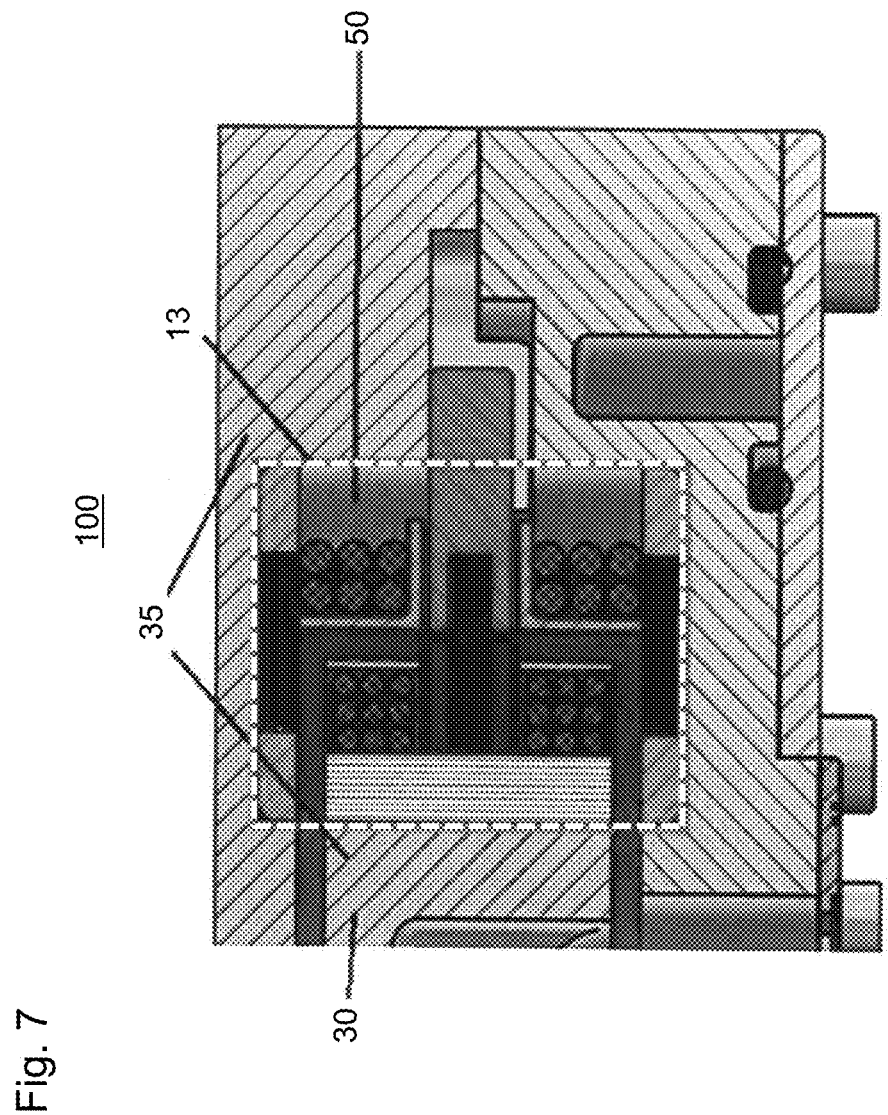
FIG. 7 shows a schematic cross-sectional drawing of a further exemplary energy transfer device with an additionally arranged electrically conductive material layer in the region of the winding.

FIG. 7 shows a schematic drawing of a cross section of a further exemplary energy transfer device 100. The energy transfer device 100 comprises a rotor 30 and a stator 50 with an aluminum housing 35. The axis of rotation extends vertically on the left edge of the picture. A flat coating of the aluminum body 35 in the region of the winding with silver or copper, which is indicated in FIG. 7 as a dashed line, significantly increases the quality of the coil system. The aluminum body or the housing 35 is therefore the active part of the energy transfer device 100 in this embodiment.

As explained with reference to FIGS. 1 to 7, additional electrically highly conductive materials can be used in the active part of a rotating energy transfer device 100 in order to reduce a development of heat. An active part is any region that is directly or partially exposed to the magnetic field. The electrically highly conductive materials are preferably only used in places where otherwise poorly conductive materials come into contact with the magnetic field or in places where field shielding toward the outside is necessary. If a material is non-conductive, no eddy currents are induced. However, there is no shielding effect then, since the shielding effect is caused by eddy currents.

Figure 8C:
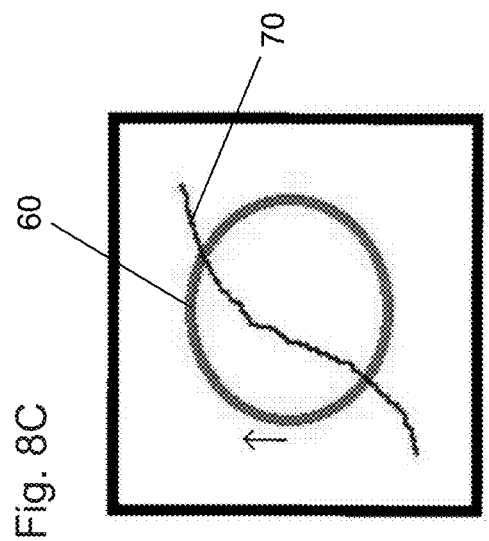
FIGS. 8A-8D show schematic sketches of the influence of polishing of the surface of an electrically conductive material layer additionally arranged according to the invention, FIGS. 8a and 8b relating to the case of a polished material and FIGS. 8c and 8d relating to the case of a material with a notch.
Figure 8A:
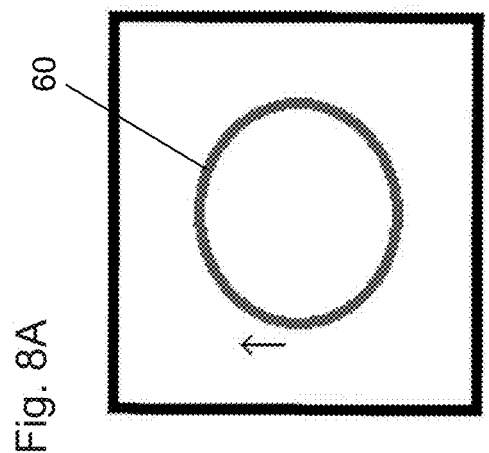
Figure 8D:
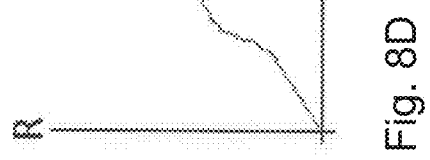
Figure 8B:
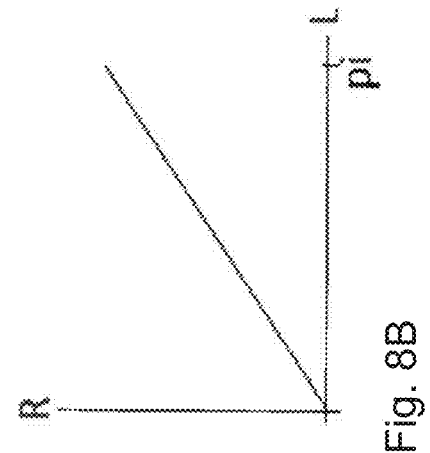

Besides or in addition to the use of highly conductive material, polishing the surface of this material can also be advantageous. A polished surface ensures a shorter path along which an eddy current propagates. FIG. 8 schematically illustrates the propagation of an arising eddy current 60 in a rectangular plate, specifically for the case of a polished material (FIGS. 8a and 8b) and for the case of a material with a notch 70 (FIGS. 8c and 8d). As can be seen from FIGS. 8a and 8b, in the case of a polished material, the associated resistance R increases linearly and without jumps over the circumferential length pi of the eddy current 60. As can be seen from FIGS. 8c and 8d, in the case of an unpolished material or a material with a notch 70, the associated resistance R increases non-linearly over the circumferential length pi of the eddy current 60. Due to the notch 70, the path along which the eddy current 60 propagates increases. This results in a non-linear increase in resistance in the region of the notch 70, and thus to higher losses or higher heat development due to the eddy current 60. In other words, polishing or removing notches 70 ensures a further reduction in heat development. The influence of notches 70 is directly related to the penetration depth. If the notches 70 are less deep than the penetration depth of the eddy current 60 is, the effect is also small. Since the electric loading drops with 1/e according to the table above, even a relatively small notch 70 with a depth of e.g. 100 μm can have a negative effect on the heat development. This negative effect is counteracted by polishing.

In summary, the present disclosure describes a solution as to how the heating caused by eddy currents can be reduced in an energy transfer device or in rotating (inductive) energy transfer systems. Induced eddy currents cause losses in the rotor and stator. The solution is particularly advantageous for the electrical excitation of electrically excited synchronous machines for the purposes of a slip ring replacement, but can also be used in other rotating energy transfer systems. High-frequency electromagnetic waves cause eddy currents (skin effect) induced on the surface of electrically conductive materials, which heat the surface (e.g. in the shaft and in the region of the winding). The penetration depth depends on the material and the frequency of the magnetic field and is in the nano- to μ-meter range. The cooling, in particular for the shaft, is technically very problematic. By applying an electrically highly conductive material layer (e.g. made of copper, silver, etc.) to the electrically active parts (e.g. in the region of the stator winding, shaft, etc.) of the rotating energy transmitter, heating can be reduced. This is because the conductivity of these materials is higher than that of steel. However, they are expensive and do not have sufficient mechanical stability to replace steel. Since the penetration depth of the eddy currents in these highly conductive materials is very small, it is sufficient to apply a thin layer of these highly conductive materials to the electrically active parts. Furthermore, the surface can also be polished in order to further reduce heating or losses.

REFERENCE NUMERAL LIST 12 shaft or drive shaft (steel shaft)
13 additional electrically conductive material layer
15 bearing or ball bearing
16 semiconductor
17 circuit board with insulating foil
19 heat sink
21 copper platelet
23 ferrite platelet
25 ferrite mat with plastic carrier
27 rotor winding with plastic carrier
29 rotor sleeve
30 rotor
35 housing
37 ferrite carrier
38 ferrite rods
40 stator winding with plastic carrier
41 bearing or ball bearing
42 ferrite disk
43 copper disk
45 cover
50 stator
60 eddy current
70 notch
100 energy transfer device

The invention claimed is:
1. A method for increasing the efficiency of an energy transfer device with which electrical energy is converted contactlessly into electrical energy with the aid of a magnetic field in order to electrically excite a rotor of an electrical machine, the method comprising:
arranging an electrically conductive material layer on at least one active part of the energy transfer device, wherein an active part of the energy transfer device is a part of the energy transfer device which is at least partially exposed to the magnetic field used for energy transfer, wherein the electrical conductivity of the electrically conductive material layer is greater than the electrical conductivity of the at least one active part, and wherein a layer thickness of the arranged electrically conductive material layer is selected as a function of a predetermined frequency of the magnetic field used for energy transfer.

2. The method according to claim 1, wherein the at least one active part of the energy transfer device is a component of a stationary primary side and/or a rotatable secondary side of the energy transfer device.

3. The method according to claim 1, wherein the at least one active part of the energy transfer device comprises a shaft and/or a heat sink and/or a ferrite platelet and/or a housing and/or a stator winding and/or a rotor winding and/or a ferrite disk and/or a cover of the energy transfer device.

4. The method according to claim 1, wherein the layer thickness of the arranged electrically conductive material layer corresponds to at least a penetration depth ($\delta$) into the material of the electrically conductive material layer, caused by the skin effect, at the predetermined frequency of the magnetic field used for energy transfer, and wherein the layer thickness of the arranged electrically conductive material layer is at least twice the penetration depth ($\delta$) into the material of the electrically conductive material layer, caused by the skin effect, at the predetermined frequency of the magnetic field used for energy transfer.

5. The method according to claim 1, wherein the electrically conductive material layer has a relative permeability $\mu_r$ of approximately 1.

6. The method according to claim 1, wherein a surface of the arranged electrically conductive material layer is polished.

7. The method according to claim 1, wherein the application of the electrically conductive material layer onto the at least one active part of the energy transfer device takes place by pressing and/or welding and/or shrinking and/or electroplating.

8. The method according to claim 1, wherein the at least one active part comprises a magnetic flux carrier element with a ferrite-polymer composite material, and wherein the electrically conductive material layer is arranged directly to the magnetic flux carrier element.

9. The method according to claim 1, wherein the electrically conductive material layer is electrically isolated from the at least one active part and/or from the electrical machine.

10. The method according to claim 1, wherein the electrically conductive material layer has the layer thickness selected such that the electrically conductive material layer shields a high-frequency intrinsic magnetic field of the energy transfer device and/or does not have any effect with respect to an extrinsic magnetic field of the electrical machine.

11. An energy transfer device for the contactless conversion of electrical energy into electrical energy with the aid of a magnetic field in order to electrically excite a rotor of an electrical machine, comprising:

an electrically conductive material layer that is arranged on at least one active part of the energy transfer device, wherein an active part of the energy transfer device is a part of the energy transfer device which is at least partially exposed to the magnetic field used for energy transfer, and wherein the electrical conductivity of the electrically conductive material layer is greater than the electrical conductivity of the at least one active part; and wherein a layer thickness of the arranged electrically conductive material layer is selected as a function of a predetermined frequency of the magnetic field used for energy transfer.

12. A method of using an electrically conductive material in an energy transfer device to convert electrical energy contactlessly into electrical energy with the aid of a magnetic field in order to electrically excite a rotor of an electrical machine, the method comprising:

arranging the electrically conductive material as a material layer on at least one active part of the energy transfer device, wherein an active part of the energy transfer device is a part of the energy transfer device which is at least partially exposed to the magnetic field used for energy transfer, and wherein the electrical conductivity of the applied electrically conductive material is greater than the electrical conductivity of the at least one active part; and wherein a layer thickness of the arranged electrically conductive material layer is selected as a function of a predetermined frequency of the magnetic field used for energy transfer.

13. The method according to claim 12, wherein the active part of the energy transfer device comprises at least one magnetic flux carrier element that is at least partially formed from a ferrite composite.

14. A method for increasing the efficiency of an energy transfer device with which electrical energy is converted contactlessly into electrical energy with the aid of a magnetic field in order to electrically excite a rotor of an electrical machine, the method comprising:

arranging an electrically conductive material layer on at least one active part of the energy transfer device, wherein an active part of the energy transfer device is a part of the energy transfer device which is at least partially exposed to the magnetic field used for energy transfer, wherein the electrical conductivity of the electrically conductive material layer is greater than the electrical conductivity of the at least one active part, wherein a layer thickness of the arranged electrically conductive material layer corresponds to at least a penetration depth ($\delta$) into the material of the electrically conductive material layer, caused by the skin effect, at a predetermined frequency of the magnetic field used for energy transfer.

15. An energy transfer device for the contactless conversion of electrical energy into electrical energy with the aid of a magnetic field in order to electrically excite a rotor of an electrical machine, comprising:

an electrically conductive material layer that is arranged on at least one active part of the energy transfer device, wherein an active part of the energy transfer device is a part of the energy transfer device which is at least partially exposed to the magnetic field used for energy transfer, wherein the electrical conductivity of the electrically conductive material layer is greater than the electrical conductivity of the at least one active part, and wherein a layer thickness of the arranged electrically conductive material layer corresponds to at least a penetration depth ($\delta$) into the material of the electrically conductive material layer, caused by the skin effect, at a predetermined frequency of the magnetic field used for energy transfer.

\* \* \* \* \*

UNITED STATES PATENT AND TRADEMARK OFFICE
CERTIFICATE OF CORRECTION

| | |
|---|---|
| PATENT NO. | : 11,870,307 B2 |
| APPLICATION NO. | : 17/339612 |
| DATED | : January 9, 2024 |
| INVENTOR(S) | : David Maier, Marcel Maier and Nejila Parspour |

It is certified that error appears in the above-identified patent and that said Letters Patent is hereby corrected as shown below:

On the Title Page

Item (71) for the Applicant, delete "Universitat Stuttgart" and add -- Universität Stuttgart --.

Signed and Sealed this
Sixth Day of August, 2024

Katherine Kelly Vidal
*Director of the United States Patent and Trademark Office*